US012649813B2

(12) United States Patent
Langanke et al.

(10) Patent No.: US 12,649,813 B2
(45) Date of Patent: Jun. 9, 2026

(54) METHOD FOR PRODUCING POLYOXYMETHYLENE POLYOXYALKYLENE COPOLYMERS

(71) Applicant: Power2Polymers GmbH, Aachen (DE)

(72) Inventors: Jens Langanke, Mechernich (DE); Aurel Wolf, Wülfrath (DE); Christoph Guertler, Cologne (DE)

(73) Assignee: Power2Polymers GmbH, Aachen (DE)

( * ) Notice: Subject to any disclaimer, the term of this patent is extended or adjusted under 35 U.S.C. 154(b) by 815 days.

(21) Appl. No.: 17/772,762

(22) PCT Filed: Dec. 14, 2020

(86) PCT No.: PCT/EP2020/085885
§ 371 (c)(1),
(2) Date: Apr. 28, 2022

(87) PCT Pub. No.: WO2021/122402
PCT Pub. Date: Jun. 24, 2021

(65) Prior Publication Data
US 2022/0403087 A1 Dec. 22, 2022

(30) Foreign Application Priority Data
Dec. 18, 2019 (EP) .................................... 19217701

(51) Int. Cl.
*C08G 2/08* (2006.01)
*C08G 2/22* (2006.01)

(52) U.S. Cl.
CPC ................. *C08G 2/08* (2013.01); *C08G 2/22* (2013.01)

(58) Field of Classification Search
CPC ............. C08G 2/08; C08G 2/22; C08G 65/26
See application file for complete search history.

(56) References Cited

U.S. PATENT DOCUMENTS

| | | | |
|---|---|---|---|
| 10,093,772 B2 * | 10/2018 | Peckermann .......... A61Q 19/00 |
| 2006/0205915 A1 | 9/2006 | Groer et al. |
| 2014/0142344 A1 * | 5/2014 | Lorenz ............... C08G 65/2609 |
| | | | 568/620 |
| 2017/0096526 A1 * | 4/2017 | Peckermann .......... C08G 18/56 |

FOREIGN PATENT DOCUMENTS

WO 2015155094 A1 10/2015

OTHER PUBLICATIONS

International Search Report for International Patent Application No. PCT/EP2020/085885, mailed Jan. 15, 2021. (English translation attached).
Written Opinion for International Patent Application No. PCT/EP2020/085885, mailed Jan. 15, 2021.

* cited by examiner

*Primary Examiner* — Gregory Listvoyb
(74) *Attorney, Agent, or Firm* — Foley & Lardner LLP

(57) ABSTRACT

A method for producing a polyoxymethylene polyoxyalkylene copolymer, comprising reacting a polymer formaldehyde compound with an alkylene oxide in the presence of a double metal cyanide (DMC) catalyst, wherein the polymer formaldehyde compound comprises at least one terminal hydroxyl group and wherein the method comprises the steps of placing a suspending agent in a reactor and subsequently incrementally or continuously metering in the polymer formaldehyde compound into the reactor during the reaction is provided.

14 Claims, No Drawings

METHOD FOR PRODUCING POLYOXYMETHYLENE POLYOXYALKYLENE COPOLYMERS

CROSS REFERENCE TO RELATED APPLICATIONS

This application is a U.S. national stage application, filed under 35 U.S.C. § 371, of International Application No. PCT/EP2020/085885, which was filed on Dec. 14, 2020, which claims priority to European Patent Application No. 19217701.2, which was filed on Dec. 18, 2019. The contents of each are hereby incorporated by reference into this specification.

FIELD

The present invention describes a process for preparing polyoxymethylene-polyoxyalkylene copolymers.

BACKGROUND

Copolymers containing polyoxymethylene units in addition to other polymer and polycondensate units are described, for example, in JP 2007 211082 A, WO 2004/096746 A1, GB 807589, EP 1 418 190 A1, U.S. Pat. Nos. 3,754,053, 3,575,930, US 2002/0016395 and JP 04-306215.

U.S. Pat. No. 3,575,930 describes the reaction of dihydroxy-terminated paraformaldehyde $HO-(CH_2O)_n-H$ having n=2-64 with diisocyanates to give isocyanate-terminated polyoxymethylene polymers, which can be converted to polyurethane compounds in the reaction with diols.

JP 2007 211082 A describes the reaction of polyoxyalkylene polyols having an equivalent weight of ≥2500 with formaldehyde, formaldehyde oligomers or formaldehyde polymers to give polyoxymethylene-polyoxyalkylene copolymers using anionic or cationic polymerization catalysts. The employed high molecular weight polyoxyalkylene polyol starters having low polydispersity are prepared via double metal cyanide (DMC) catalysis. Because of the high molecular weight of the polyoxyalkylene polyols, the resultant polyoxymethylene-polyoxyalkylene copolymers have a molecular weight of at least >5000 g/mol and are therefore less widely usable as a polyurethane unit. Furthermore, the direct reaction of the polyoxyalkylene polyols with the polyoxymethylene polymers via a melt-kneading process necessitates the use of high temperatures and corresponding specific high-viscosity apparatus (extruders, kneaders, etc.).

U.S. Pat. No. 3,754,053 describes polyoxymethylene-polyoxyalkylene copolymers having a molecular weight of ≥10 000 g/mol. Production of copolymers having an inner polyoxymethylene block comprises reacting trioxane to afford a polyoxymethylene prepolymer in a first step and then reacting the latter with alkylene oxides in the presence of for example NaOH as a polymerization catalyst. Here too, the polymers described are not very suitable for uses as a polyurethane unit because of their high molecular weight. WO 2004/096746 A1 discloses the reaction of formaldehyde oligomers with alkylene oxides and/or isocyanates. In this method the described use of formaldehyde oligomers $HO-(CH_2O)_n-H$ affords polyoxymethylene block copolymers having a relatively narrow molar mass distribution of n=2-19, an additional thermal removal process step being required for the provision of the formaldehyde oligomers from aqueous formalin solution. The obtained formaldehyde oligomer solutions are not storage-stable and therefore require immediate subsequent further processing. Moreover, these applications do not disclose differentiated activation conditions, for example the activation temperature, the alkoxylation catalysts used, which are disadvantageous from safety and quality-relevant aspects among others for any possible industrial scale application because of undefined temperature peaks during the exothermic polymerization process (22.7 kcal/mol PO from M. Ionescu; Chemistry and Technology of Polyols for Polyurethanes, Rapra Techn. Ltd., 2005). Furthermore, only block copolymers having very short formaldehyde blocks are obtainable via this method.

EP 1 870 425 A1 discloses a process for preparing polyoxyalkylene-containing polyols by condensation of substituted or unsubstituted phenol structures with formaldehydes and/or other substituted alkanal structures. The resulting phenol-formaldehyde condensates are used here as polyol starters for the alkoxylation, and no oxymethylene repeating units are formed within these starter compounds. In addition, the resulting properties of the alkoxylated polyols containing aromatic systems differ fundamentally from aliphatic polyol structures because of the different chemical structures.

WO2012/091968 A1 claims a process for preparing polyetherols by polymerization of alkylene oxides onto a starter compound using DMC catalysts. Disclosed here as formaldehyde-associated structures are oligomeric phenolformaldehyde condensates as corresponding starters which are fundamentally structurally distinct from the polyoxymethylene starter structure.

WO2015/155094 A1 discloses a process for preparing polyoxymethylene block copolymers comprising the step of activating the DMC catalyst in the presence of an OH-terminated polymeric formaldehyde compound with a defined amount of alkylene oxide and an optionally subsequent polymerization with alkylene oxides which is optionally carried out in the presence of further comonomers. In a first step the DMC catalyst is activated in the presence of the polymeric formaldehyde starter compound, wherein activation of the DMC catalyst is accomplished by adding a subamount (based on the total amount of the amount of alkylene oxides employed in the activation and polymerization) of one or more alkylene oxides, and in a second step one or more alkylene oxides and optionally further comonomers are added to the mixture resulting from step (i). The activation of the DMC catalyst in the first step (i) is carried out at an activation temperature ($T_{act}$) of 20° C. to 120° C. However, this process has a long activation time. In addition, high catalyst loadings of up to 10 000 ppm or more are also disclosed, these increased amounts of catalyst having to be provided and also being removed for subsequent applications after preparation of the polyoxymethylene copolymer to reduce the proportion of the heavy metal-containing double metal cyanide catalyst. On account of this semi-batch process the entire amount of the polymeric formaldehyde starter compound is also provided and therefore, compared to conventional polyether polyol production processes with comparable equivalent weights, very high viscosities result for the reaction mixture and the partially alkoxylated intermediate species, especially for the suspension of the polymeric formaldehyde starter compound and the suspension medium. This requires special stirrer geometries and power inputs which may not be available in commercially available polyol plants and would require costly and inconvenient installation. Furthermore, the higher amounts of static gaseous alkylene oxide, for example propylene oxide, result in a higher pressurization potential in the case of a plant malfunction. This in turn necessitates elevated apparatus and organizational safety requirements.

SUMMARY

Starting from the prior art, it was accordingly an object of the present invention to provide a simple and economically advantageous process for preparing polyoxymethylene-polyoxyalkylene copolymers based on oligomeric and polymeric forms of formaldehyde as the starter substance which overcomes the problems resulting from the prior art.

The amount of the double metal cyanide (DMC) catalyst in the production process is to be reduced and the concentration of polymeric formaldehyde starter compound in the reaction mixture is to be reduced, thus also allowing the process to be run in conventional polyol reactors with conventional stirrer geometries and power inputs. The amount of static alkylene oxide is to also be reduced to increase process safety. It is a further object of the present invention to reduce the proportion of undesired low molecular weight byproducts having formate and methoxy end groups.

According to the invention this object is achieved by a process for preparing a polyoxymethylene-polyoxyalkylene copolymer comprising reaction of a polymeric formaldehyde compound with an alkylene oxide in the presence of a double metal cyanide (DMC) catalyst;

wherein the polymeric formaldehyde compound has at least one terminal hydroxyl group;

wherein the process comprises the steps of:

(α) initially charging a suspension medium in a reactor and (γ) stepwise or continuous metered addition of the polymeric formaldehyde compound into the reactor during the reaction.

The use of the word "a" in connection with countable parameters should be understood here and hereinafter to mean the number one only when this is evident from the context (for example through the wording "precisely one"). Otherwise, expressions such as "an alkylene oxide", "a polymeric formaldehyde compound" etc. always also encompass embodiments in which two or more alkylene oxides, two or more polymeric formaldehyde compounds etc. are used.

DETAILED DESCRIPTION

The invention is illustrated in detail hereinafter. Various embodiments may be combined with one another as desired unless the opposite is clearly apparent to a person skilled in the art from the context.

In the context of the present invention polyoxymethylene copolymers are to be understood as meaning polymeric compounds containing polyoxymethylene units and polyoxyalkylene and/or polyoxyalkylene carbonate units.

In one embodiment of the process according to the invention, the polyoxymethylene-polyoxyalkylene copolymer has a number-average molecular weight of 1000 g/mol to 10 000 g/mol, preferably of 1000 g/mol to 8400 g/mol, wherein the number-average molecular weight was determined by gel permeation chromatography (GPC) based on DIN 55672-1: "Gel permeation chromatography—Part 1: Tetrahydrofuran as elution solvent", wherein polystyrene samples of known molar mass were used for calibration.

The obtained polyoxymethylene copolymers offer a number of advantages over existing polymers. Thus, particular physical properties such as glass transition temperatures, melting ranges, viscosities and solubilities etc. may be specifically controlled via the length of the polyoxymethylene blocks relative to the oligomeric polyoxyalkylene blocks.

Compared to polyoxymethylene homopolymers of the same molecular weight, partial crystallinity in the polyoxymethylene-polyoxyalkylene copolymers of the invention is typically lowered, which typically likewise leads to a lowering of glass transition temperatures, melting points and viscosities, etc. The presence of additional polyoxyalkylene blocks additionally leads typically to a distinct increase in the chemical and thermal stability. In addition, the polyoxymethylene-polyoxyalkylene copolymers obtained generally have good solubilities in various solvents, are usually meltable readily and without loss of mass, or are already in the liquid state at low temperatures. Compared to polyoxymethylene homopolymers, the polyoxymethylene-polyoxyalkylene copolymers thus show significantly better processability.

Compared to polyether polyols of the same molecular weight, the proportion of polyoxyalkylene units which are prepared from the corresponding alkylene oxides is reduced by the polyoxymethylene content, which contributes to an advantageous economic viability of the product. Various physical properties, such as glass transition temperatures, melting ranges, viscosities, solubility, etc., for a given molecular weight, can be controlled in a targeted manner via the length of the polyoxymethylene blocks in relation to the polyoxyalkylene blocks and via the molecular weight of the polymeric formaldehyde compound (polyoxymethylene block) used.

This may result in advantageous physical properties, particularly of conversion products of these polymers, and hence enable new applications.

A poly oxymethylene block in the context of the invention refers to a polymeric structural unit —(CH2-O-)x, wherein x is an integer $\geq 2$, containing at least one CH2 group bonded to two oxygen atoms which is bonded via at least one of the oxygen atoms to further methylene groups or other polymeric structures. Poly oxymethylene blocks —(CH2-O—)x preferably contain an average of $x \geq 2$ to $x \leq 1000$, more preferably an average of $x \geq 2$ to $x \leq 400$ and especially preferably an average of $x \geq 8$ to $x \leq 100$ oxymethylene units. In the context of the invention a polyoxymethylene block is also to be understood as meaning blocks containing small proportions of further monomeric and/or oligomeric units, generally less than 25 mol % based on the total amount of the monomer units present in the block.

In the context of the invention polyoxyalkylene blocks in the context of the present invention also include blocks incorporating (small) proportions of further comonomers, generally less than 50 mol %, preferably less than 25 mol %, based on the total amount of all repeating units present in the oligomeric block. In one embodiment of the process according to the invention, these polyoxyalkylene blocks may be effected for example by ring opening and subsequent polymerization of propylene oxide and/or ethylene oxide to form polyether units, wherein these hydroxyl groups are terminated. In a further embodiment of the process according to the invention, these polyoxyalkylene blocks may be effected for example by ring opening and subsequent polymerization of propylene oxide and/or ethylene oxide in the presence of carbon dioxide (CO2) to form polyether and carbonate units (polyether carbonate).

The term "alkyl" in the context of the overall invention generally includes substituents from the group of n-alkyl such as ethyl or propyl, branched alkyl and/or cycloalkyl. The term "aryl" in the context of the overall invention generally includes substituents from the group of monocyclic carbo- or heteroaryl substituents such as phenyl and/or polycyclic carbo- or heteroaryl substituents which may optionally be substituted by further alkyl groups and/or heteroatoms such as nitrogen, oxygen, silicon, sulfur or phosphorus. The radicals R1, R2, R3 and/or R4 may be joined to one another within a repeating unit such that they form cyclic structures, for example a cycloalkyl radical incorporated into the polymer chain via two adjacent carbon atoms.

In the process according to the invention a suspension medium is initially charged in a reactor.

In one embodiment of the process according to the invention, the suspension medium in step (α) contains no H-functional groups.

It is preferable when in step (α) a suspension medium containing no H-functional groups is initially charged in the reactor together with DMC catalyst and no polymeric formaldehyde compound is initially charged in the reactor. Alternatively, it is also possible in step (α) to initially charge the reactor with a suspension medium containing no H-functional groups and additionally with a subamount of the polymeric formaldehyde compound and optionally DMC catalyst.

In a preferred embodiment, inert gas (for example argon or nitrogen), an inert gas/carbon dioxide mixture or carbon dioxide is introduced into the resulting mixture of suspension medium and DMC catalyst at a temperature of 50° C. to 120° C., preferably of 60° C. to 110° C. and more preferably of 70° C. to 100° C. and at the same time a reduced pressure (absolute) of 10 mbar to 800 mbar, more preferably of 50 mbar to 200 mbar, is applied.

In an alternative preferred embodiment, the resulting mixture of suspension medium and DMC catalyst is contacted at least once, preferably three times, at a temperature of 50° C. to 120° C., preferably of 60° C. to 110° C. and more preferably of 70° C. to 100° C. with 1.5 bar to 10 bar (absolute), more preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can be added in solid form or as a suspension in a suspension medium or in a mixture of at least two suspension media.

In a further preferred embodiment, in step (α)

(α-I) the suspension medium or a mixture of at least two suspension media is initially charged and (α-II) the temperature of the suspension medium or the mixture of at least two suspension media is brought to 50° C. to 120° C., preferably 60° C. to 110° C. and more preferably 70° C. to 100° C. and/or the pressure in the reactor is reduced to less than 500 mbar, preferably 5 mbar to 100 mbar, wherein an inert gas stream (for example of argon or nitrogen), an inert gas/carbon dioxide stream or a carbon dioxide stream is optionally passed through the reactor, wherein the double metal cyanide catalyst is added to the suspension medium or to the mixture of at least two suspension media in step (α-I) or immediately thereafter in step (α-II) and wherein the suspension medium contains no H-functional groups.

Step (β) serves to activate the DMC catalyst. This step may optionally be performed under an inert gas atmosphere, under an atmosphere of inert gas/carbon dioxide mixture or under a carbon dioxide atmosphere. Activation in the context of the present invention refers to a step in which a subamount of alkylene oxide compound is added to the DMC catalyst suspension at temperatures of 50° C. to 120° C., preferably of 55° C. to 110° C. and more preferably of 60° C. to 100° C. and then the addition of the alkylene oxide compound is stopped, wherein due to a subsequent exothermic chemical reaction an evolution of heat, which can lead to a temperature spike ("hotspot"), is observed and due to the conversion of alkylene oxide and possibly $CO_2$ a pressure drop in the reactor is observed. The process step of activation is the period from addition of the subamount of alkylene oxide compound, optionally in the presence of $CO_2$, to the DMC catalyst until evolution of heat occurs. Optionally, the subamount of alkylene oxide compound can be added to the DMC catalyst in a plurality of individual steps, optionally in the presence of $CO_2$, and the addition of the alkylene oxide compound can in each case then be halted. In this case the process step of activation comprises the period from addition of the first subamount of alkylene oxide compound, optionally in the presence of $CO_2$, to the DMC catalyst until evolution of heat occurs after addition of the last subamount of alkylene oxide compound. The activation step may generally be preceded by a step for drying the DMC catalyst and optionally the polymeric formaldehyde compound at elevated temperature and/or reduced pressure, optionally with passage of an inert gas through the reaction mixture.

Metered addition of one or more alkylene oxides (and optionally of the carbon dioxide) may in principle be effected in different ways. The metered addition can be commenced from the vacuum or at a previously chosen supply pressure. The supply pressure is preferably established by introducing an inert gas (for example nitrogen or argon) or carbon dioxide, wherein the (absolute) pressure is 5 mbar to 100 bar, by preference 10 mbar to 50 bar and preferably 20 mbar to 50 bar.

In a preferred embodiment, the amount of one or more alkylene oxides used in the activation in step (β) is 0.1% to 25.0% by weight, preferably 1.0% to 20.0% by weight, more preferably 2.0% to 16.0% by weight (based on the amount of suspension medium used in step (α)). The alkylene oxide may be added in one step or portionwise in two or more subamounts. It is preferable when after addition of a subamount of alkylene oxide compound the addition of the alkylene oxide compound is interrupted until the evolution of heat occurs and the next subamount of alkylene oxide compound is added only then.

In the process according to the invention in step (γ) the polymeric formaldehyde compound is metered into the reactor stepwise or continuously.

In a preferred embodiment of the process according to the invention, in step (γ) the polymeric formaldehyde compound and the alkylene oxide are metered in continuously.

The metered addition of one or more polymeric formaldehyde compounds, one or more alkylene oxides and optionally also of the carbon dioxide can be effected simultaneously or sequentially (in portions); for example, it is possible to add the total amount of carbon dioxide, the amount of polymeric formaldehyde compound and/or the amount of alkylene oxides metered in in step (γ) all at once or continuously. The term "continuously" as used here can be defined as a mode of addition of a reactant such that a concentration of the reactant effective for the copolymerization is maintained, meaning that, for example, the metered addition may be carried out at a constant addition rate, at a varying addition rate or portionwise.

It is possible, during the addition of the alkylene oxide and/or of the polymeric formaldehyde compound, to increase or lower the $CO_2$ pressure gradually or stepwise or to leave it constant. The total pressure is preferably kept constant during the reaction by metered addition of further carbon dioxide. The metered addition of one or more alkylene oxides and/or the one or more polymeric formaldehyde compounds is carried out simultaneously or sequentially with the carbon dioxide metered addition. It is possible to effect metered addition of the alkylene oxide at a constant addition rate or to increase or lower the addition rate gradually or stepwise or to add the alkylene oxide portionwise. The alkylene oxide is preferably added to the reaction mixture at a constant addition rate. If two or more alkylene oxides are used for synthesis of the polyoxymethylene-polyoxyalkylene copolymers, the alkylene oxides may be metered in individually or as a mixture. The metered addition of the alkylene oxides/the polymeric formaldehyde compound may be effected simultaneously or sequentially via separate metered addition means (feeds) in each case or via one or more metered addition means, wherein the alkylene oxides/the polymeric formaldehyde compounds may be metered in individually or as a mixture. It is possible via the manner and/or sequence of the metered addition of the polymeric formaldehyde compounds, of the alkylene oxides and/or of the carbon dioxide to synthesize random, alternating, block-type or gradient-type polyoxymethylene-polyoxyalkylene copolymers.

In a preferred embodiment, in step ($\gamma$) the metered addition of the one or more polymeric formaldehyde compounds is terminated prior to the addition of the alkylene oxide.

In a further embodiment of the process according to the invention, an excess of carbon dioxide based on the calculated amount of carbon dioxide incorporated in the polyether carbonate polyol is employed, since an excess of carbon dioxide is advantageous because of the inertness of carbon dioxide. The amount of carbon dioxide may be determined via the total pressure under the particular reaction conditions. An advantageous total pressure (absolute) for the copolymerization for preparing the polyether carbonate polyols has been found to be in the range from 0.01 to 120 bar, preferably 0.1 to 110 bar, more preferably from 1 to 100 bar. The carbon dioxide may be supplied continuously or discontinuously. This depends on how quickly the alkylene oxides are consumed and on whether the product is to include any $CO_2$-free polyether blocks. The amount of the carbon dioxide (reported as pressure) can likewise be varied during addition of the alkylene oxides. $CO_2$ may also be added to the reactor as a solid and then converted under the selected reaction conditions into the gaseous, dissolved, liquid and/or supercritical state.

A preferred embodiment of the process according to the invention is inter alia characterized in that in step ($\gamma$) the total amount of the one or more polymeric formaldehyde compounds is added. This addition may be effected at a constant addition rate, at a varying addition rate or portionwise.

For the process according to the invention it has further been found that the copolymerization in the presence of carbon dioxide (step ($\gamma$)) to prepare the polyoxymethylene-polyether carbonate polyol copolymers or the polymerization in the presence of an inert gas such as for example nitrogen to form polyoxymethylene-polyether polyol copolymers is advantageously performed at temperatures of 50° C. to 120° C., preferably of 60° C. to 110° C. and particularly preferably of 70° C. to 100° C. If temperatures are set below 50° C., the reaction generally becomes very slow. At temperatures above 120° C. the amount of undesired byproducts increases severely and decomposition of the polymeric formaldehyde compound takes place.

The metered addition of the alkylene oxide, the polymeric formaldehyde compound and the DMC catalyst may be effected via separate or combined metered addition points. In a preferred embodiment, the alkylene oxide and the polymeric formaldehyde compound are continuously supplied to the reaction mixture via separate metered addition points. This addition of the one or more polymeric formaldehyde compounds can be effected as a continuous metered addition into the reactor or portionwise.

Steps ($\alpha$), ($\beta$) and ($\gamma$) may be performed in the same reactor or may each be performed separately in different reactors. Particularly preferred reactor types are: tubular reactors, stirred tanks, loop reactors.

Polyoxymethylene-polyoxyalkylene copolymers may be prepared in a stirred tank, the stirred tank being cooled via the reactor jacket, internal cooling surfaces and/or cooling surfaces within a pumped circulation circuit, depending on the embodiment and mode of operation. Both in the semi-batch application, where the product is withdrawn only once the reaction has ended, and in the continuous application, where the product is withdrawn continuously, particular attention should be paid to the metered addition rate of the alkylene oxide. Said rate should be adjusted such that despite the inhibiting effect of the carbon dioxide and/or of the polymeric formaldehyde compound the alkylene oxides react sufficiently rapidly. The concentration of free alkylene oxides in the reaction mixture during the activation step (step $\beta$) is preferably >0% to 100% by weight, more preferably >0% to 50% by weight, most preferably >0% to 20% by weight (in each case based on the weight of the reaction mixture). The concentration of free alkylene oxides in the reaction mixture during the reaction (step $\gamma$) is preferably >0% to 40% by weight, more preferably >0% to 25% by weight, most preferably >0% to 20% by weight, in each case based on the weight of the reaction mixture.

In a preferred embodiment, the activated DMC catalyst/suspension medium mixture that results according to steps ($\alpha$) and ($\beta$) is further reacted with one or more alkylene oxide(s), one or more polymeric formaldehyde compounds and optionally carbon dioxide in the same reactor. In a further preferred embodiment, the activated DMC catalyst/suspension medium mixture that results according to steps ($\alpha$) and ($\beta$) is further reacted with alkylene oxides, one or more polymeric formaldehyde compounds and optionally carbon dioxide in a different reaction vessel (for example a stirred tank, tubular reactor or loop reactor).

When conducting the reaction in a tubular reactor the activated catalyst/suspension medium mixture that results according to steps ($\alpha$) and ($\beta$), one or more polymeric formaldehyde compounds, one or more alkylene oxides and optionally carbon dioxide are continuously pumped through a tube. The molar ratios of the co-reactants are varied according to the desired polymer. In a preferred embodiment, carbon dioxide is metered in in its liquid or supercritical form to achieve optimal miscibility of the components. It is advantageous to install mixing elements for better mixing of the co-reactants, such as are marketed for example by Ehrfeld Mikrotechnik BTS GmbH, or mixer-heat exchanger elements which simultaneously improve mixing and heat removal.

It is likewise possible to employ loop reactors for preparation of polyoxymethylene-polyoxyalkylene copolymers. These generally include reactors with recycling, for example a jet loop reactor, which can also be operated continuously, or a loop-shaped tubular reactor with suitable apparatuses for circulation of the reaction mixture or a loop of a plurality of serially connected tubular reactors. The use of a loop reactor is advantageous particularly because backmixing may be realized here, so that the concentration of free alkylene oxides in the reaction mixture may be kept within the optimal range, preferably in the range from >0 to 40 wt %, more preferably >0 to 25 wt %, most preferably >0 to 16 wt % (in each case based on the weight of the reaction mixture).

It is preferable when the polyoxymethylene-polyoxyalkylene copolymers are prepared in a continuous process which comprises both a continuous copolymerization and a continuous addition of the one or more polymeric formaldehyde compounds.

In a further embodiment of the process according to the invention, in step (γ) the resulting reaction mixture is continuously removed from the reactor.

The invention therefore also provides a process wherein in step (γ) one or more polymeric formaldehyde compounds, one or more alkylene oxide(s) and DMC catalyst are continuously metered into the reactor optionally in the presence of carbon dioxide ("copolymerization") and wherein the resulting reaction mixture (containing the reaction product) is continuously removed from the reactor.

For example, for the continuous process for preparing the polyoxymethylene-polyoxyalkylene copolymers according to steps (α) and (β) an activated DMC catalyst/suspension medium mixture is prepared, then, according to step (γ), (γ1) a subamount of each of one or more polymeric formaldehyde compounds, one or more alkylene oxides and optionally carbon dioxide are metered in to initiate the copolymerization and (γ2) during the progress of the copolymerization the remaining amount of each of DMC catalyst, one or more polymeric formaldehyde compounds and alkylene oxides is metered in continuously optionally in the presence of carbon dioxide, with simultaneous continuous removal of resulting reaction mixture from the reactor.

In step (γ), the DMC catalyst is preferably added in the form of a suspension in the suspension medium with H-functional groups or suspension medium without H-functional groups, preferably suspension medium without H-functional groups, the amount preferably being chosen such that the content of DMC catalyst in the resulting reaction product is 10 to 10 000 ppm, more preferably 20 to 5000 ppm, and most preferably 50 to 800 ppm.

Preferably, steps (α) and (β) are performed in a first reactor, and the resulting reaction mixture is then transferred into a second reactor for the copolymerization of step (γ). However, it is also possible to perform steps (α), (β) and (γ) in one reactor.

It has also been found that the process of the present invention can be used for preparation of large amounts of the polyoxymethylene-polyoxyalkylene copolymer product, wherein a DMC catalyst activated according to steps (α) and (β) in a suspension medium is initially used, and the DMC catalyst is added without prior activation during the copolymerization (γ).

A particularly advantageous feature of the preferred embodiment of the present invention is thus the ability to use "fresh" DMC catalysts without activation for the subamount of DMC catalyst which is added continuously in step (γ). An activation of DMC catalysts to be performed analogously to step (β) entails not just additional attention from the operator, thus resulting in an increase in manufacturing costs, but also requires a pressure reaction vessel, thus also resulting in an increase in the capital costs in the construction of a corresponding production plant. Here, "fresh" catalyst is defined as unactivated DMC catalyst in solid form or in the form of a slurry in a polymeric formaldehyde compound or suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. Catalyst feeding may be effected in a truly continuous manner or in relatively tightly spaced increments. Equally, continuous addition of the polymeric formaldehyde compound may be effected in a truly continuous manner or in increments. There would be no departure from the present process in adding a DMC catalyst or reactants incrementally such that the concentration of the materials added drops essentially to zero for a period of time before the next incremental addition. However, it is preferable for the DMC catalyst concentration to be kept substantially at the same concentration during the main portion of the course of the continuous reaction, and for starter substance to be present during the main portion of the copolymerization process. Incremental addition of DMC catalyst and/or reactant that does not significantly affect the characteristics of the product is nevertheless "continuous" in the sense in which the term is used here. It is possible, for example, to provide a recycling loop in which a portion of the reacting mixture is recycled to a prior point in the process, thus smoothing out discontinuities caused by incremental additions.

In an optional step (δ) the reaction mixture continuously removed in step (γ) which generally has an alkylene oxide content of from 0.05% by weight to 10% by weight may be transferred into a postreactor in which, by way of a postreaction, the content of free alkylene oxide is reduced to less than 0.05% by weight in the reaction mixture. The postreactor employed may be a tubular reactor, a loop reactor or a stirred tank for example.

The pressure in this postreactor is preferably at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 50° C. to 150° C. and more preferably 80° C. to 140° C.

Suitable polymeric formaldehyde compounds for the process of the invention are in principle those oligomeric and polymeric forms of formaldehyde having at least one terminal hydroxyl group for reaction with the alkylene oxides and any further comonomers. According to the invention, the term "terminal hydroxyl group" is to be understood as meaning in particular a terminal hemiacetal functionality which is formed as a structural feature by the polymerization of formaldehyde. For example, the starter compounds may be oligomers and polymers of formaldehyde of general formula $HO$—$(CH_2O)_n$—$H$ where n is an integer $\geq 2$ and where polymeric formaldehyde typically has n>8 repeating units.

Polymeric formaldehyde compounds suitable for the process according to the invention generally have molecular weights from 62 to 30 000 g/mol, preferably from 62 to 12 000 g/mol, particularly preferably from 242 to 6000 g/mol and very particularly preferably from 242 to 3000 g/mol and comprise from 2 to 1000, preferably from 2 to 400, particularly preferably from 8 to 200 and very particularly preferably from 8 to 100 oxymethylene repeating units n. The compounds used in the process according to the invention typically have a functionality (F) of 1 to 3 but in certain cases can also be polyfunctional, i.e. have a functionality >3. The process according to the invention preferably employs open-chain polymeric formaldehyde compounds having terminal hydroxyl groups and having a functionality of 1 to 10, preferably of 1 to 5, particularly preferably of 2 to 3. It is very particularly preferable when the process according to the invention employs linear polymeric formaldehyde compounds having a functionality of 2. The functionality F corresponds to the number of OH end groups per molecule.

Preparation of the polymeric formaldehyde compounds used for the process according to the invention may be carried out by known processes (cf., for example, M. Haubs et al., 2012, Polyoxymethylenes, Ullmann's Encyclopedia of Industrial Chemistry; G. Reus et al., 2012, Formaldehyde, ibid.). The process according to the invention may in principle also employ the formaldehyde compounds in the form of a copolymer, wherein comonomers included in the polymer in addition to formaldehyde are, for example, 1,4-dioxane or 1,3-dioxolane. Further suitable formaldehyde copolymers for the process according to the invention are copolymers of formaldehyde and of trioxane with cyclic and/or linear formals, for example butanediol formal, or epoxides. It is likewise conceivable for higher homologous aldehydes, for example acetaldehyde, propionaldehyde, etc., to be incorporated into the formaldehyde polymer as comonomers. It is likewise conceivable for formaldehyde compounds according to the invention in turn to be prepared from H-functional starter compounds; obtainable here in particular through the use of polyfunctional compounds are polymeric formaldehyde compounds having a hydroxyl end group functionality F>2 (cf., for example, WO 1981001712 A1, Bull. Chem. Soc. J., 1994, 67, 2560-2566, U.S. Pat. No. 3,436,375, JP 03263454, JP 2928823).

As is well known, formaldehyde requires only the presence of small traces of water to polymerize. In aqueous solution a mixture of oligomers and polymers of different chain lengths which are in equilibrium with molecular formaldehyde and formaldehyde hydrate is thus formed according to the concentration and the temperature of the solution. So-called paraformaldehyde precipitates out of the solution here as a white, sparingly soluble solid, and is generally a mixture of linear formaldehyde polymers where n=8 to 100 repeat oxymethylene units.

One particular advantage of the process of the invention is that polymeric formaldehyde or so-called paraformaldehyde, which is commercially available and inexpensive, may be used directly as a reactant without the need for additional preparatory steps. In an advantageous embodiment of the invention, paraformaldehyde is therefore employed as the reactant. It is in particular possible via the molecular weight and the end group functionality of the polymeric formaldehyde compound to introduce polyoxymethylene blocks of defined molar weight and functionality into the product.

The length of the polyoxymethylene block may advantageously be controlled in simple fashion in the process according to the invention via the molecular weight of the employed formaldehyde compound. Preferably employed here are linear formaldehyde compounds of general formula $HO—(CH_2O)_n—H$, wherein n is an integer $\geq 2$, preferably where n=2 to 1000, particularly preferably where n=2 to 400 and very particularly preferably where n=8 to 100, having two terminal hydroxyl groups. Especially also employable as starter compound are mixtures of polymeric formaldehyde compounds of formula $HO—(CH_2O)_n—H$ having different values of n in each case. In an advantageous embodiment, the employed mixtures of polymeric formaldehyde compounds of formula $HO—(CH_2O)_n—H$ contain at least 1% by weight, preferably at least 5% by weight and particularly preferably at least 10% by weight of polymeric formaldehyde compounds where $n \geq 20$.

In a preferred embodiment of the process according to the invention, the polymeric formaldehyde compound has 2 hydroxyl groups and 8 to 100 oxymethylene repeating units (n) or 3 hydroxyl groups and 8 to 100 oxymethylene repeating units (n).

Epoxides (alkylene oxides) used for preparing the polyoxymethylene block copolymers are compounds of general formula (I):

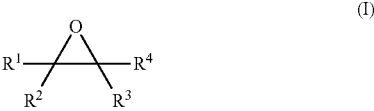

(I)

where $R^1$, $R^2$, $R^3$ and $R^4$ are independently hydrogen or an alkyl or aryl radical optionally containing additional heteroatoms, such as nitrogen, oxygen, silicon, sulfur or phosphorus, and may optionally be joined to one another so as to form cyclic structures, for example a cycloalkylene oxide.

In the context of the process according to the invention it is in principle possible to use any alkylene oxides suitable for polymerization in the presence of a DMC catalyst. If different alkylene oxides are used, these may be metered in either as a mixture or consecutively. In the case of the latter metered addition, the polyether chains of the polyoxymethylene-polyoxyalkylene copolymer obtained in this way may in turn likewise have a block structure.

The process according to the invention may generally employ alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. The epoxide of general formula (I) is preferably a terminal epoxide wherein R1, R2 and R3 are hydrogen and R4 may be hydrogen, an alkyl or aryl radical optionally containing additional heteroatoms such as nitrogen, oxygen, silicon, sulfur or phosphorus and may differ in different repeating units.

In a preferred embodiment of the process according to the invention, the alkylene oxide is one or more compound(s) selected from the group consisting of ethylene oxide, propylene oxide, styrene oxide and cyclohexene oxide, preferably ethylene oxide and propylene oxide and more preferably propylene oxide.

The double metal cyanide compounds present in the DMC catalysts preferably employable in the process according to the invention are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and allow preparation of polyether carbonates at very low catalyst concentrations. A typical example is that of the highly active DMC catalysts described in EP-A 700 949 which, as well as a double metal cyanide compound (e.g. zinc hexacyanocobaltate(III)) and an organic complex ligand (e.g. tert-butanol), also contain a polyether having a number-average molecular weight greater than 500 g/mol.

The DMC catalysts which can be used in accordance with the invention are preferably obtained by (1.) reacting an aqueous solution of a metal salt with the aqueous solution of a metal cyanide salt in the presence of one or more organic complex ligands, e.g. an ether or alcohol, in a first step, (2.) removing the solid from the suspension obtained from (a) by known techniques (such as centrifugation or filtration) in a second step, (3.) optionally washing the isolated solid with an aqueous solution of an organic complex ligand (for example by resuspending and subsequent reisolating by filtration or centrifugation) in a third step, (4.) and subsequently drying the solid obtained at temperatures of in general 20-120° C. and at pressures of in general 0.1 mbar to atmospheric pressure (1013 mbar), optionally after pulverizing, wherein in the first step or immediately after the precipitation of the double metal cyanide compound (second step) one or more organic complex ligands, preferably in excess (based on the double metal cyanide compound), and optionally further complex-forming components are added.

The double metal cyanide compounds present in the DMC catalysts that can be used in accordance with the invention are the reaction products of water-soluble metal salts and water-soluble metal cyanide salts.

By way of example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparing the double metal cyanide compounds preferably have a composition according to the general formula (II), $$M(X)n, \qquad \text{(II)}$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (III)

$$Mr(X)3, \qquad \text{(III)}$$

where

M is selected from the metal cations $Fe^{3+}$, $Al^{3+}$, $Co^{3+}$ and $Cr^{3+}$, X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts preferably have a composition according to the general formula (IV)

$$M(X)s, \qquad \text{(IV)}$$

where

M is selected from the metal cations $Mo^{4+}$, $V^{4+}$ and $W^{4+}$,

X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts preferably have a composition according to general formula (V)

$$M(X)t, \qquad \text{(V)}$$

where

M is selected from the metal cations $Mo^{6+}$ and $W^{6+}$,

X comprises one or more (i.e. different) anions, preferably anions selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VI)

$$(Y)_a \, M'(CN)_b \, (A)_c, \tag{VI}$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and a, b and c are integers, wherein the values for a, b and c are selected so as to ensure the electroneutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (VII)

$$M_x[M'_{x'}(CN)_y]_z, \tag{VII}$$

in which M is defined as in the formulae (I) to (IV) and

M' is as defined in formula (V), and x, x', y and z are integers and are selected such as to ensure the electroneutrality of the double metal cyanide compound.

It is preferable when x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, gallic acids or salts, esters or amides thereof, cyclodextrins, phosphorus compounds, $\alpha,\beta$-unsaturated carboxylic esters, or ionic surface-active or interface-active compounds.

In the preparation of the DMC catalysts which can be used in accordance with the invention, preference is given to using the aqueous solutions of the metal salt (e.g. zinc chloride) in the first step in a stoichiometric excess (at least 50 mol %) relative to the metal cyanide salt. This corresponds to at least a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

The organic complex ligand may be present in the aqueous solution of the metal salt and/or of the metal cyanide salt or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. The complex-forming component is preferably employed in a mixture with water and organic complex ligand. A preferred process for performing the first step (i.e. the preparation of the suspension) is effected using a mixing nozzle, particularly preferably using a jet disperser, as described, for example, in WO-A 01/39883.

In the second step, the solid (i.e. the precursor of the catalyst) can be isolated from the suspension by known techniques, such as centrifugation or filtration.

In a preferred variant, the isolated solid is then washed with an aqueous solution of the organic complex ligand (for example by resuspension and subsequent reisolation by filtration or centrifugation) in a third process step. In this way, for example, water-soluble by-products, such as potassium chloride, can be removed from the catalyst that can be used in accordance with the invention. Preferably, the amount of the organic complex ligand in the aqueous wash solution is between 40% and 80% by weight, based on the overall solution.

Optionally in the third step the aqueous wash solution is admixed with a further complex-forming component, preferably in a range between 0.5 and 5 wt %, based on the overall solution.

It is moreover advantageous to wash the isolated solid more than once. In a first washing step (3.-1), washing is preferably effected with an aqueous solution of the unsaturated alcohol (for example by resuspension and subsequent reisolation by filtration or centrifugation), in order thereby to remove, for example, water-soluble by-products, such as potassium chloride, from the catalyst usable in accordance with the invention. The amount of the unsaturated alcohol in the aqueous wash solution is more preferably between 40% and 80% by weight, based on the overall solution of the first washing step. In the further washing steps (3.-2), either the first washing step is repeated one or more times, preferably from one to three times, or, preferably, a nonaqueous solution, for example a mixture or solution of unsaturated alcohol and further complex-forming component (preferably in the range between 0.5 and 5 wt %, based on the total amount of the wash solution of step (3.-2)), is employed as the wash solution, and the solid is washed therewith one or more times, preferably one to three times.

The isolated and optionally washed solid can then be dried, optionally after pulverization, at temperatures of 20-100° C. and at pressures of 0.1 mbar to standard pressure (1013 mbar).

A preferred process for isolating the DMC catalysts employable in accordance with the invention from the suspension by filtration, filtercake washing and drying is described in WO-A 01/80994.

The double metal cyanide (DMC) catalyst is preferably employed in a theoretical amount of 50 to 800 ppm, preferably of 100 to 700 ppm, more preferably of 150 to 700, based on the sum of the masses of the polymeric formaldehyde compound and the alkylene oxide. The use of more than 800 ppm results in a high proportion of the DMC catalyst and the heavy metals require removal before any further reaction to form the polyurethane. Catalytic conversion is no longer observable below 50 ppm of the double metal cyanide (DMC) catalyst.

It is a characteristic of DMC catalysts that they exhibit specific "catch-up" kinetics (M. Ionescu; Chemistry and Technology of Polyols for Polyurethanes 2$^{nd}$ Edition, Rapra Techn. Ltd., 2016 section 5.1), wherein for mixtures of H-functional starter substances of low equivalent weight and high equivalent weight the alkoxylation, especially the propoxylation, preferably takes place at the H-functional starter substance of lower equivalent weight.

The process according to the invention employs suspension media with H-functional groups or suspension media without H-functional groups, preferably suspension media without H-functional groups.

In a preferred embodiment, the suspension media used have no H-functional groups. Suitable suspension media having no H-functional groups include all polar aprotic, weakly polar aprotic and nonpolar aprotic solvents, none of which contain any H-functional groups. A mixture of two or more of these suspension media may also be employed as the suspension medium.

In one embodiment of the process according to the invention, in step ($\alpha$) the suspension medium containing no H-functional groups is one or more compounds selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene and carbon tetrachloride.

Preferred suspension media containing no H-functional groups include 4-methyl-2-oxo-1,3-dioxolane, 1,3-dioxolan-2-one, toluene, xylene, ethylbenzene, chlorobenzene and dichlorobenzene and also mixtures of two or more of these suspension media; particular preference is given to 4-methyl-2-oxo-1,3-dioxolane and 1,3-dioxolan-2-one and toluene or a mixture of 4-methyl-2-oxo-1,3-dioxolane and 1,3-dioxolan-2-one and/or toluene. It is likewise also possible to use as the suspension medium a further starter compound, that is in liquid form under the reaction conditions, in a mixture with the polymeric formaldehyde starter compound.

In an alternative embodiment of the process according to the invention, in step ($\alpha$) a suspension medium containing H-functional groups is initially charged in the reactor together with DMC catalyst. In a preferred embodiment, the suspension medium containing H-functional groups containing the DMC catalyst is a polyoxymethylene-polyoxyalkylene copolymer obtainable from a preceding production process containing an activated DMC catalyst. This saves possible separation steps compared to use of a suspension medium comprising no H-functional groups, thus resulting in a simpler and more efficient process.

EXAMPLES

Employed Compounds:

Paraformaldehyde (pFA for short) marketed as Granuform® M from Ineos was used. Propylene oxide (PO for short; purity ≥99%), 4-methyl-2-oxo-1,3-dioxolane (cyclic propylene carbonate or cPC for short; purity ≥99%) and toluene (dry, purity 99.8%) were obtained from Sigma-Aldrich Chemie GmbH and used without purification. The catalyst used in all examples was a DMC catalyst prepared according to example 6 in WO 01/80994 A1, containing zinc hexacyanocobaltate, tert-butanol and polypropylene glycol having a number-average molecular weight of 1000 g/mol.

Method Description:

$^1$H NMR Analysis:

The composition of the reaction mixtures were determined by $^1$H NMR (Bruker DPX 400, 400 MHz; pulse program zg30, relaxation time D1: 10 s, 64 scans). Each sample was dissolved in deuterated chloroform. The relevant resonances in the $^1$H NMR (relative to TMS=0 ppm) and the assignment of the area integrals (A) are as follows:

cyclic propylene carbonate (cPC), resonance at 4.5 ppm, area integral corresponds to one H atom;

toluene (if not completely removed by workup under vacuum), resonances at 7.1 to 7.3 and 2.3 ppm, area integral corresponds to 8H atoms;

unreacted monomeric propylene oxide (PO) (if not completely removed by workup under vacuum), resonance at 2.4 and 2.75 ppm, area integral corresponds to one H atom in each case;

polypropylene oxide (PPO), PO homopolymer, resonances at 1.0 to 1.2 ppm, area integral corresponds to 3H atoms;

poly- or paraformaldehyde (pFA), resonances at 4.6 to 5.2 ppm, area integral corresponds to 2H atoms. In the presence of cPC, also minus one H atom of the cyclic propylene carbonate (cPC);

formate (HCOO), by-product, resonance at 8.1 ppm, area integral corresponds to one H atom;

methoxy (MeO), by-product, resonance at 3.4 ppm, area integral corresponds to 3 H atoms;

The mole fractions (x) of the reaction mixture are determined as follows:

x(cPC)=A(4.5 ppm)
x(toluene)=A(7.1-7.3 ppm)/5
x(PO)=A(2.75 ppm) or A(2.4 ppm)
x(PPO)=A(1.0-1.2 ppm)/3
x(pFA)=A(4.6-5.2 ppm)/2
In the presence of cPC: x(pFA)=(A(4.6-5.2 ppm))/2−x(cPC)
x(HCOO)=A(8.1 ppm)
x(MeO)=A(3.4 ppm)/3

The percentage mole fraction is calculated by dividing the mole fraction (x) of the respective component by the sum of the mole fractions present in the sample. The weight fraction is also calculated by multiplying the mole fractions (x) by the accompanying molar masses and dividing by the sum of the parts by weight present. Conversion of the weight fractions uses the following molar masses (g/mol): cPC=102, toluene=92, PO and PPO=58, pFA=30, HCOO=45, MeO=31. The polymer composition is calculated and normalized using the proportions of PPO and pFA so that here too the reported amounts are in parts by weight out of 100 (% by weight).

Gel Permeation Chromatography (GPC):

The weight-average and number-average molecular weights Mw and Mn of the resulting polymers were determined by gel permeation chromatography (GPC). The procedure was based on DIN 55672-1: "Gel permeation chromatography—Part 1: Tetrahydrofuran as elution solvent". Polystyrene samples of known molar mass were used for calibration. The polydispersity index (PDI for short) is calculated from the quotient of the weight-average and number-average molecular weights.

Example 1: Preparation of the Polyoxymethylene-Polyalkylene Oxide Copolymer with a Total DMC Catalyst Loading of 500 ppm and Continuous pFA and PO Addition in Step γ

Employed here was a flange reactor equipped with a double jacket, internal temperature sensor, multi-level stirrer, bottom drain, intensive cooler, cellular wheel sluice for continuous metered addition of pFA, liquid metered addition means for continuous addition of PO and nitrogen blanketing. 152 g of cPC and 100 mg of unactivated DMC catalyst were initially charged into the inertized reactor, the mixture was stirred and heated to 95° C. and a nitrogen flow of 300

L/h was established. 30 minutes later, the intensive cooler was brought online and the nitrogen flow was stopped. 10 g of PO were then added quickly at 10 g/min. Onset of the reaction was indicated by a temperature peak ("hotspot"). For further activation 10 g of PO were added in an analogous manner two further times. Here too, a temperature peak ("hotspot") was observed in each case. This was followed by simultaneous metering of 170 g of PO at a continuous addition rate of 0.7 g/min and 50 g of pFA at a continuous addition rate of 0.28 g/min. After commencement of the continuous metered addition of pFA and PO a reaction temperature of 90° C. was established. 74 min after termination of the PO addition the stirrer was stopped and the reaction mixture was withdrawn and freed of volatile constituents on a rotary evaporator at 60° C. and 10 mbar and examined by GPC and NMR analysis.

M_n(GPC)=2263 g/mol
PDI=1.32

The polymer was found to have a formaldehyde content of 20.2% by weight according to NMR. The proportion of formate and methoxy end groups was altogether less than 0.5% by weight according to NMR.

Example 2 (Comparative): Preparation of the Polyoxymethylene-Polyalkylene Oxide Copolymer with a Total DMC Catalyst Loading of 2000 ppm and Only Continuous PO Addition in Step γ

1400 mg of dried, unactivated DMC catalyst were suspended in 200.0 g of cPC in a 1.0 L pressure reactor. The suspension was heated to 130° C. with stirring. Simultaneously a vacuum was applied for 30 min and a pressure of 100 mbar was established with a constant volume flow of nitrogen through the reactor (so-called vacuum stripping). Once vacuum stripping was complete the vacuum pump was deactivated and the reactor was cooled to room temperature and brought to ambient pressure using nitrogen. 157.2 g of pFA were added to the suspension and the reactor was resealed. The reactor internal temperature was set to 70° C. 160 g of PO were added quickly to the suspension at an addition rate of 10 g/min. Onset of the reaction was indicated by a temperature peak ("hotspot") in conjunction with a simultaneous pressure drop. This was followed by metered addition of 363 g of PO at a continuous addition rate of 3 g/min. Once addition was complete the mixture was stirred at 70° C. until the exothermic reaction had abated and until a constant pressure was achieved. The reaction mixture was then withdrawn and freed of volatile constituents on a rotary evaporator at 60° C. and 10 mbar and examined by GPC and NMR analysis.

M_n(GPC)=3156 g/mol
PDI=1.23

The polymer was found to have a formaldehyde content of 23.5% by weight according to NMR. The proportion of formate and methoxy end groups was altogether less than 1.0% by weight according to NMR.

Example 3 (Comparative): Preparation of the Polyoxymethylene-Polyalkylene Oxide Copolymer with a Total DMC Catalyst Loading of 810 ppm and Only Continuous PO Addition in Step γ

500 mg of dried, unactivated DMC catalyst were suspended in 250.0 g of toluene in a 1.0 L pressure reactor. The suspension was heated to 130° C. with stirring. An N_2 pressure of 40 bar was applied before the N_2 pressure was reduced to 15 bar again. The application and release of N_2 pressure was performed twice further in the same way (so-called pressure stripping). Once pressure stripping was complete the reactor was cooled to room temperature and brought to ambient pressure using nitrogen. 112.3 g of pFA were added to the suspension and the reactor was resealed. This was followed by renewed pressure stripping at room temperature. The reactor internal temperature was set to 70° C. After achieving the temperature 120 g of PO were added quickly to the suspension at an addition rate of 10 g/min. Onset of the reaction was indicated by a temperature peak ("hotspot") in conjunction with a simultaneous pressure drop. This was followed by metered addition of 377 g of PO at a continuous addition rate of 3 g/min. Once addition was complete the mixture was stirred at 70° C. until the exothermic reaction had abated and until a constant pressure was achieved. The reaction mixture was then withdrawn and freed of volatile constituents on a rotary evaporator at 60° C. and 10 mbar and examined by GPC and NMR analysis.

$M_n$(GPC)=3441 g/mol

PDI=1.21

The polymer was found to have a formaldehyde content of 17.7% by weight according to NMR. The proportion of formate and methoxy end groups was altogether less than 1.0% by weight according to NMR.

Example 4 (Comparative): Preparation of the Polyoxymethylene-Polyalkylene Oxide Copolymer with a Total DMC Catalyst Loading of 500 ppm and Only Continuous PO Addition in Step γ

The experiment was performed analogously to Example 3 with a selected catalyst loading of 500 ppm. After 120 g of PO were added quickly (activation) neither an exothermic reaction nor a pressure drop were observable over a period of 8 hours. The reaction mixture was then withdrawn and examined by GPC and NMR analysis. No chain-extended product was detectable.

(γ) stepwise or continuous metered addition of the polymeric formaldehyde compound into the reactor during the reaction.

2. The process as claimed in claim 1, wherein after step (α) (β) a subamount of alkylene oxide is added to the mixture from step (α) at a temperature in the range of 50° C. to 120° C. and wherein the addition of the alkylene oxide compound is then interrupted.

3. The process as claimed in claim 1, wherein in step (γ) the polymeric formaldehyde compound and the alkylene oxide are metered in continuously.

4. The process as claimed in claim 1, wherein in step (γ) the metered addition of the polymeric formaldehyde compound is terminated prior to the addition of the alkylene oxide.

5. The process as claimed in claim 1, wherein in step (γ) the resulting reaction mixture is continuously removed from the reactor.

6. The process as claimed in claim 1, wherein in step (γ) DMC catalyst is continuously metered into the reactor and the resulting reaction mixture is continuously removed from the reactor.

7. The process as claimed in claim 1, wherein in step (α) the suspension medium contains no H-functional groups.

8. The process as claimed in claim 7, wherein in step (α) a suspension medium containing no H-functional groups is initially charged in the reactor together with DMC catalyst.

9. The process as claimed in claim 1, wherein in step (α) the suspension medium contains no H-functional groups and is one or more compounds selected from the group consisting of 4-methyl-2-oxo-1,3-dioxolane, 1,3-dioxolan-2-one, acetone, methylethylketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene and carbon tetrachloride.

TABLE 1

| Example | Suspension medium | Continuous addition in step γ | Catalyst loading[a] [ppm] | $M_n$(GPC), g/mol[b] | PDI | Formaldehyde content in polymer [% by wt.][d] | Proportion of formate and methoxy end groups [% by wt.][e] |
|---|---|---|---|---|---|---|---|
| 1 | cPC | pFA and PO | 500 | 2263 | 1.32 | 20.2 | <0.5 |
| 2 (comp.) | cPC | PO | 2000 | 3156 | 1.23 | 23.5 | <1.0 |
| 3 (comp.) | toluene | PO | 810 | 3441 | 1.21 | 17.7 | <1.0 |
| 4 (comp.) | toluene | PO | 500 | —[c] | — | — | — |

[a]DMC catalyst loading based on the sum of the masses of the polymeric formaldehyde compound and the alkylene oxide,
[b]number-average molecular weight of the polyoxymethylene-polyoxyalkylene copolymer,
[c]no chain-extended product was obtained,
[d]determined by NMR,
[e]total determined by NMR based on the reaction mixture

The invention claimed is:

1. A process for preparing a polyoxymethylenepolyoxyalkylene copolymer, the process comprising reacting a polymeric formaldehyde compound with an alkylene oxide in the presence of a double metal cyanide (DMC) catalyst;

wherein the polymeric formaldehyde compound has at least one terminal hydroxyl group;

wherein the process comprises the steps of:
(α) initially charging a suspension medium into a reactor; and

10. The process as claimed in claim 1, wherein the alkylene oxide is one or more compounds selected from the group consisting of ethylene oxide, propylene oxide, styrene oxide and cyclohexene oxide.

11. The process as claimed in claim 1, wherein the polymeric formaldehyde compound has 2 hydroxyl groups and 8 to 100 oxymethylene repeating units or 3 hydroxyl groups and 8 to 100 oxymethylene repeating units.

12. The process as claimed in claim 1, wherein step (γ) is carried out at a temperature in the range of 50° C. to 120° C.

13. The process as claimed in claim 1, wherein the double metal cyanide catalyst is employed in a theoretical amount of 50 to 800 ppm based on the sum of the masses of the polymeric formaldehyde compound and the alkylene oxide.

14. A polyoxymethylene-polyoxyalkylene copolymer obtainable by the following process:

reacting a polymeric formaldehyde compound with an alkylene oxide in the presence of a double metal cyanide (DMC) catalyst;

wherein the polymeric formaldehyde compound has at least one terminal hydroxyl group;

wherein the process comprises the steps of:

(α) initially charging a suspension medium into a reactor; and (γ) stepwise or continuous metered addition of the polymeric formaldehyde compound into the reactor during the reaction.

\* \* \* \* \*